United States Patent [19]

Witek et al.

[11] Patent Number: 4,797,836

[45] Date of Patent: Jan. 10, 1989

[54] IMAGE ORIENTATION AND ANIMATION USING QUATERNIONS

[75] Inventors: Francis A. Witek, Cedar Ridge; David E. Lake, Jr., Penn Valley, both of Calif.

[73] Assignee: The Grass Valley Group, Inc., Grass Valley, Calif.

[21] Appl. No.: 932,805

[22] Filed: Nov. 19, 1986

[51] Int. Cl.$^4$ .......................... G06F 15/66; G09G 1/16
[52] U.S. Cl. ...................................... 364/518; 340/725
[58] Field of Search ................ 364/518, 522; 340/725, 340/727

[56] References Cited

U.S. PATENT DOCUMENTS

| | | | |
|---|---|---|---|
| 4,092,716 | 5/1978 | Berg et al. | 364/424 |
| 4,134,681 | 1/1979 | Elmer | 356/152 |
| 4,600,919 | 7/1986 | Stern | 340/725 |
| 4,620,287 | 10/1986 | Yam | 364/518 |
| 4,625,289 | 11/1986 | Rockwood | 364/522 |
| 4,631,690 | 12/1986 | Corthout et al. | 364/518 |

Primary Examiner—Gary V. Harkcom
Assistant Examiner—Randy W. Lacasse
Attorney, Agent, or Firm—Francis I. Gray

[57] ABSTRACT

A method for orientating and animating video images using quaternions to provide smooth, predictable rotations in a digital video effect device. Euler angles for a new orientation are input by an operator and are converted into an appropriate quaternion. For incremental orientation changes the appropriate quaternion is combined with the current quaternion of the video image in either source or target space to form a new quaternion for the new orientation of the video image. A selected plurality of such new quaternions in a sequence make up the video effect keyframes. In executing the video effect a Bezier spherical linear algorithm is used to interpolate intermediate quaternions on a video field by field basis between neighboring pairs of keyframe quaternions based upon the source keyframe quaternion, the destination keyframe quaternion, a source outgoing keyframe quaternion, a destination incoming keyframe quaternion and an inbetweening time coefficient. The intermediate quaternions are fine tuned by referring to tension, continuity and bias parameters.

21 Claims, 4 Drawing Sheets

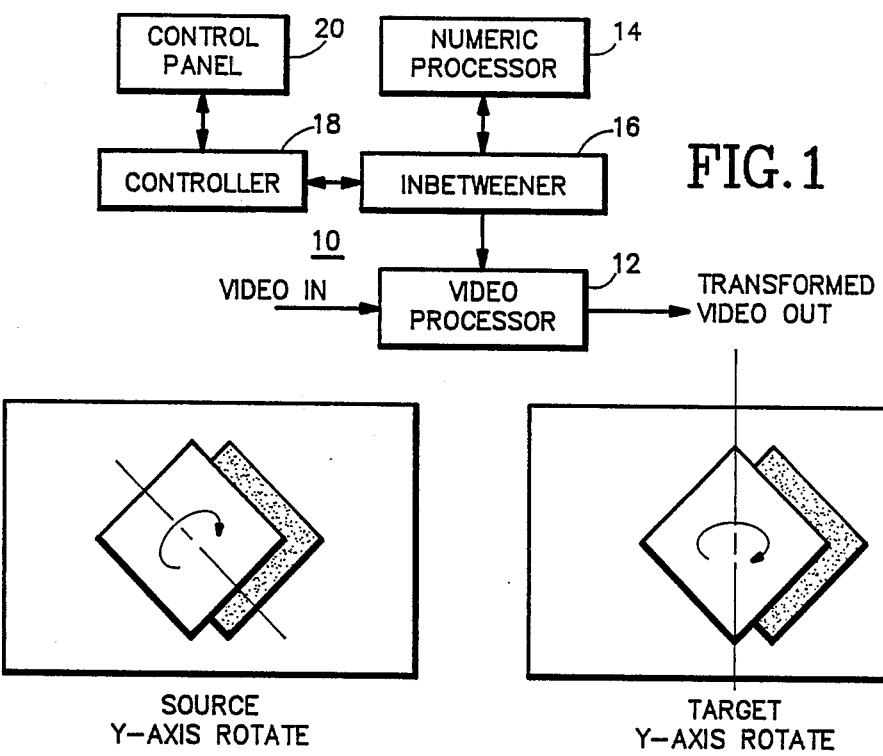
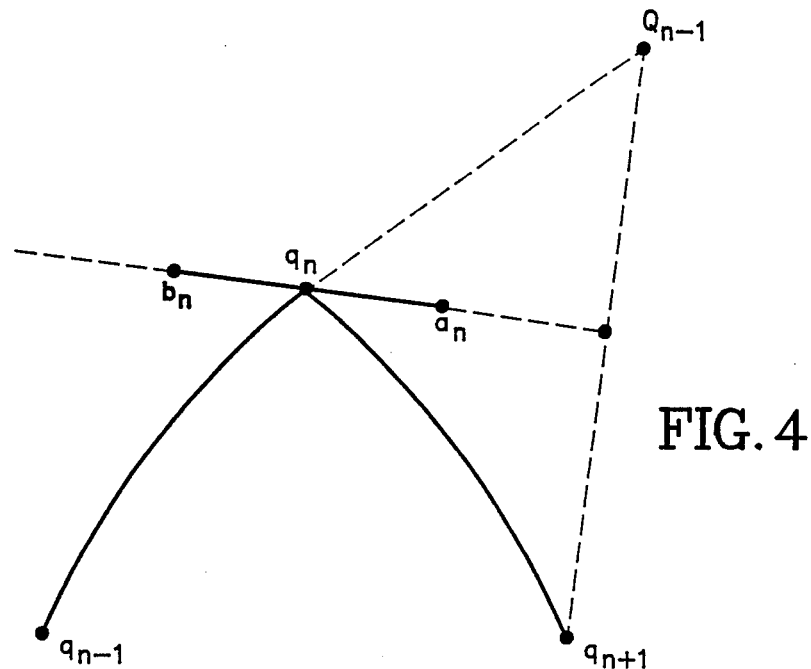

IMAGE ORIENTATION AND ANIMATION USING QUATERNIONS

BACKGROUND OF THE INVENTION

The present invention relates to computer orientation and animation of objects in three dimensions (3D), and more particularly to a method of image orientation and animation for rotating video pictures in real time and interpolating the rotation orientation of the video pictures to animate a sequence of keyframes based upon representing the rotation orientation of an object in three dimensional space using quaternions.

Computer animation of three dimensional objects imitates the key frame techniques of traditional animation, using key positions in space instead of key drawings. The general position of a rigid body can be given by combining a translation with a rotation. Computer animators key such transformations to control both simulated cameras and objects to be transformed. The common prior solution, as apparently illustrated by the ADO Digital Video Effects (DVE) System of Ampex Corporation, Redwood City, Calif. and by the Encore Digital Video Effects System of Quantel, Inc., Salt Lake City, Utah, used three Euler anglss interpolated independently, but this did not produce an ideal solution. Representing the orientation in terms of three angles has an adverse effect on both the real time (update) mode and the interpolation (run) mode. In the update mode using Euler angles to represent the rotation orientation of the image, the operator has generally very little control over the response of the image when an attempt is made to modify one or more angles of rotation. The reason for the unpredictable behavior is due to the fact that rotations are not commutative. If, for example, an orientation is specified by three angles of rotation A, B and C about the X, Y and Z axes, respectively, in that particular order, then a modification to the angle B generally results in unexpected behavior. This is true because the orientation is constructed from the identity rotation with the new B, but in the original order A, $B_{new}$, C. The image in general does not appear to have been rotated from its previous orientation about the Y-axis of the image or the Y-axis of the display surface, or monitor.

Other 3D DVE products animate between rotation orientation keyframes by independently interpolating each of the three Euler angles to produce an inbetween image. In doing so the interpolated orientations do not lie directly inbetween the two given rotation orientations. In general undesirable and indirect rotation paths are taken.

The use of quaternions in representing general rotations was first suggested in an article entitled "Animating Rotation with Quaternion Curves", SIGGRAPH '85, Vol. 19, No. 3, July 1985 by Ken Shoemake. What is suggested is an animator sitting at a workstation interactively establishing a sequence of keys for, as an example, camera orientation. The interpolating algorithm does not depend upon the nature of the interface the animator sees—all needed information is contained in the sequence of keys. The orientations are represented as matrices, so a conversion step follows. The matrices are converted to a sequence of neighboring quaternions, $q_n$, on a unit four-dimensional sphere. Each quaternion within the sequence becomes the end point of two spherical Bezier curves. Between each quaternion pair, $q_n$ and $q_{n+1}$, two additional points, $a_n$ and $b_{n+1}$, are added to control motion through joints. At this point time becomes a parameter along the composite curve. As the frame number increases, the parameter enters and leaves successive curve pieces. Within each piece a local version of the parameter, u, is adjusted to run from 0 to 1. The Bezier geometric construction produces an interpolated quaternion, $q_{n+u}$, from $q_n$, $a_n$, $b_{n+1}$, $q_{n+1}$ and u. The new interpolated quaternion is converted into a matrix which is used in rotating a list of object vectors for transforming.

Another suggestion for interpolating between keyframes was suggested by Doris H. U. Kochanek and Richard H. Bartels in a paper entitled "Interpolating Splines with Local Tension, Continuity, and Bias Control" published in *Computer Graphics*, Vol. 18, No. 3, July 1984. This method uses Hermite interpolation basis functions as the cubic interpolation polynomial having three control parameters: tension, continuity and bias. These control parameters are used to adjust the first derivatives of adjoining polynomial segments to produce desired results.

What is desired is an orientation and animation technique for rotation of video pictures which provide smooth, predictable, natural motion in real time in response to updated orientations and smooth, essentially direct path interpolation between key frames during animation runs by defining rotation about any axis in three dimensions with respect to either the video picture itself or the display surface.

SUMMARY OF THE INVENTION

Accordingly the present invention provides a method for image orientation and animation using quaternions. For an image to be rotated an operator enters desired parameters via a control panel to a controller in the form of Euler angles. The controller converts the parameters either into an incremental quaternion which is combined with a current quaternion representing the image's current rotation to form a new image orientation quaternion, or as an absolute orientation for the image which is converted by the controller into the new image orientation quaternion directly. The new image orientation is displayed on a display device or monitor in realtime. During the update mode the operator defines which image orientation is selected to be a keyframe, and a sequence of such keyframes makes up a given video effect. During run mode an interpolator processor, or inbetweener, interpolates between successive keyframe pairs on a video field by field basis to produce a sequence of intermediate quaternions using a modified Bezier Spherical Linear algorithm. For each video field input to a video processor the inbetweener calculates a new quate-rnion to provide the desired automation movement between keyframes. The interpolated quaternions from the inbetweener are sent to a numeric processor to compute the values for a rotation matrix for each field. The rotation matrix is multiplied together with other transformation matrices to form a general transformation matrix. The entries of the transformation matrix are returned to the inbetweener for application to the input video by the video processor to produce the transformed video output for display on the monitor.

The objects, advantages and novel features of the present invention will be apparent from the following detailed description when read in conjunction with the appended claims and attached drawing.

BRIEF DESCRIPTION OF THE DRAWING

FIG. 1 is a block diagram view of a digital video effects system according to the present invention.

FIGS. 3A and 3B are pictorial views illustrating the difference between source and target space, respectively, according to the present invention.

FIG. 4 is a graphical view illustrating the computation of incoming and outgoing quaternions related to a given keyframe quaternion according to the Bezier spherical linear interpolation algorithm.

DESCRIPTION OF THE PREFERRED EMBODIMENT

Figure 2:
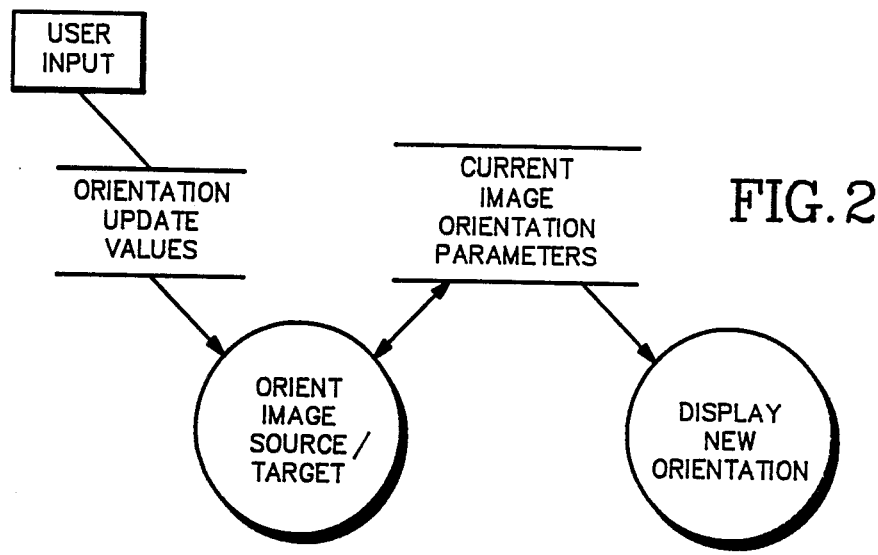
FIG. 2 is a general functional flow chart diagram of the process for orientating a video image according to the present invention.

Referring now to FIG. 1 a digital video effects (DVE) system 10 depends upon a transformation matrix which specifies how each pixel of a video image is mapped from its original position to its transformed position. In practice the inverse of the transformation matrix is used to perform the mapping. The transformed image is the totality of all the transformed pixels. The transformation matrix is generated every video field, and the matrix entries and the entries of the inverse matrix are passed to a video processor 12 which produces the transformed image.

The transformation matrix is the matrix product of a sequence of individual transformation matrices. The individual transformation matrices may include scaling, skewing, center of rotation, rotation, translation, center of perspective, perspective, post scaling and post translating. These matrices are constructed and multiplied together by a microprocessor, or numeric processor 14, dedicated to this task each video field to produce the transformation matrix. The parameters used to construct these individual matrices are sent from an inbetweener processor 16 to the numeric processor 14 every video field. The nuaeric processor 14 then returns the results to the inbetweener processor 16 for application to the input video in the video processor 12.

The inbetweener 16 receives messages, or commands, from a controller 18 for each video field. If the inbetweener 16 receives an UPDATE message from the controller 18, included in the message is the updated transformation parameter values. The inbetweener 16 updates its own local copy of the transformation parameters and then sends the complete transformation parameter list to the numeric processor 14. If the inbetweener 16 receives a RUN message from the controller, the message also contains information such as which two keyframes are being "inbetweened" and a time coefficient which specifies the percentage of time which has elapsed between the source keyframe and the destination keyframe. With this information the inbetweener 16 interpolates between the two keyframes and generates the "inbetween" values. These interpolated values are written into the inbetweener's local copy of the transformation parameters and then sent to the numeric processor 14. In both UPDATE and RUN cases the numeric processor 14 generates the transformation matrix whose entries get distributed to the video processor 12 to produce the transformed image.

The controller 18 manages the creation of effects, i.e., sequences of keyframes, and the running of the effects so created. The controller 18 manages its working copy of the image parameters that define the current image as well as the communication with the video processor 12, and interfaces with an operator via a control panel 20. The control panel 20 provides the operator with the means to manipulate the image, transform the image, create effects, edit effects, run effects and perform many other functions.

For rotation of the image, rather than representing the 3D rotation as a sequence of three angles performed in some prescribed order about fixed coordinate axes, the 3D rotation is represented as one rotation about a single axis which is free to point anywhere in three dimensions. This representation of a 3D rotation orientation is essentially what a quaternion is. Quaternions are used internally to represent the rotation orientation of the image in each step of the image transformation described above. In UPDATE mode the current orientation is combined with an incremental orientation each video field using quaternion multiplication to produce a resultant orientation, or an absolute orientation is inserted to produce directly the resultant orientation. When the operator chooses to edit the current effect by, for example, inserting a particular rotation orientation as a keyframe, quaternion derivatives, or joint segments, are computed to provide smooth cubic inbetweening at RUN time. When in RUN mode the rotation orientations are inbetweened by interpolating the two keyframe quaternions to generate the inbetween rotation. This inbetweened quaternion is then passed to the numeric processor 14 where it is converted to a rotation matrix. The rotation matrix is one of a sequence of matrices which, when multiplied together, produce the transformation matrix. Although the rotation orientation of the image is represented internally using quaternions, the user interface is in terms of Euler angles. Conversions between Euler angles and quaternions are made within the controller 18 to receive and display Euler angles.

The first process, as shown generally in FIG. 2, is a user interactive process. In this UPDATE mode the operator is able to modify the current orientation of the image by entering incremental angle values, such as via a three-axis joystick and/or an appropriate numeric keypad, or an absolute orientation, such as via an appropriate numeric keypad. The Euler angles are converted into a corresponding quaternion to produce a new image orientation directly or combined with a current orientation quaternion to produce the new orientation quaternion. The order in which the current quaternion is combined with the incremental quaterni-on is determined by the operator specified UPDATE mode, either SOURCE or TARGET. As illustrated in FIG. 3A SOURCE refers to updating the transformations with respect to the axes which are aligned with the current orientation of the image, while TARGET, as illustrated in FIG. 3B, refers to updating the transformations with respect to the axes which are fixed and aligned with the viewing plane, or display surface.

A unity, or identity, image normally contains no rotation. The plane of the unity image is parallel to that of the display surface, or monitor screen. The image orientation is represented by a quaternion which is a four component value treated as a four dimensional (4D) vector. The structure of a quaternion is as follows:

$$q=\{w,(x,y,z,)\}$$

where q is a quaternion and w, x, y and z are the four components. Any orientation in 3D space can be obtained by rotating through one angle of rotation about one axis of rotation as measured from unity. The quantity contained in the w term of the quaternion is the cosine of one-half of the angle of rotation, i.e.:

$$w = \cos(a/2)$$

where a is the angle of rotation. The x, y and z terms together define a 3D vector which points along the axis of rotation in 3D space.

The quaternion also has a magnitude of one. This is necessary because the interpolation scheme used interpolates the keyframe quaternions on a 4D sphere having a radius of one. So $w= \cos(a/2)$ and the 3D vector $<x,y,z>$ determine the axis of rotation. Since the magnitude of q is one, then the magnitude of the 3D vector must equal $\sin(a/2)$:

$$M(q)=\text{sqrt}(w*w+x*x+y*y+z*z), \text{ and}$$

$$\cos(a/2)*\cos(a/2)+ \sin(a/2)*\sin(a/2)=1.$$

As the angle "a" changes, the magnitude of $<x,y,z>$ changes, but M(q) remains constant and equal to one.

Initially at unity image the quaternion is set to $\{1,(0,0,0)\}$. $w=1$ since $a=0$ and $\cos(a/2)=1$, and $x=y=z=0$ since $a=0$ and $M<x,y,z>= \sin(a/2)=0$. The operator trims the current orientation of the image in SOURCE or TARGET space by some angle of rotation about some axis of rotation on a video field by video field basis which is accomplished by converting the three input angle values into the corresponding incremental quaternion. The current quaternion is then multiplied by the incremental quaternion to produce the new current quaternion. Since quaternion multiplication is not commutative, the order of multiplication is determined by the space selected. Quaternion multiplication is defined as follows:

$$q1=\{w1,(v1)\} \text{ where } v1= <x1,y1,z1, \text{ and}$$

$$q2=\{w2,(v2)\} \text{ where } v2= <x2,y2,z2>, \text{ then}$$

$$q1*q2=(w1w2-v1.2,(w1v2+w2v1+v1xv2)\}.$$

Quaternion multiplication is actually a method for combining two rotations into one rotation. For SOURCE space then the quaternion multiplication order is:

$$q_{new}=q_{current}*q_{inc};$$

and for TARGET space the quaternion multiplication order is:

$$q_{new}=q_{inc}*q_{current}.$$

The new orientation quaternion is then normalized to insure that its magnitude $M(q_{new})$ remains equal to one. Alternatively rather than trimming the current orientation of the image, a new orientation for the image may be directly entered. This UPDATE process is performed in the controller 18 which sends an UPDATE message along with the new quaternion to the inbetweener 16 where the transformation parameters are sent to the numeric processor 14 to generate a new transformation matrix incorporating the new rotation orientation. The transformation matrix from the numeric processor 14 is returned to the inbetweener 16 for input to the video processor to produce the transformed image on the monitor.

After the operator has rotated the image into the desired orientation the effect may be edited. The operator may insert, modify, delete, undelete or change the duration of keyframes of the current effect which is a sequence of.keyframes. Each time the operator edits the current effect, new quaternion derivatives are computed. Quaternion derivatives, or joint segments, are computed based on the new quaternion and the quaternions of the neighboring keyframes, one on each side. This is done to provide smooth, cubic interpolation motion through the keyframes when the effect is executed in RUN mode. These joint segments are themselves quaternions and act as control points which "guide" the interpolated orientation as the effect passes through its keyframes. These joint segments are used when the effect is executed to smoothly connect the rotation motion through the keyframes.

Given a quaternion $q_n$ whose joint segments are to be computed, and given $q_n$'s two closest neighboring quaternions, $q_{n-1}$ and $q_{n+1}$, one on each side with time as the reference, an incoming segment to $q_n$, $b_n$, and an outgoing segment from $q_n$, $a_n$, are computed such that the great circle arc on the 4D sphere connecting $b_n$ to $a_n$ describes a tangent to the path of interpolation as the effect passes through the keyframe at $q_n$. The computation involved is based on the fact that given any two quaternions q1 and q2 there exists a third quaternion qr such that $q1*q_r=q2$ and, in fact, $q_r=q1^{-1}*q2$. So given the three quatern-ions $q_n$, $q_{n-1}$ and $q_{n+1}$ essentially what is needed is the quaternion which maps $q_{n-1}$ to $q_n$. By applying this quaternion to $q_n$ a quaternion which is symmetrically opposite $q_{n-1}$ and colinear with $q_{n-1}$, $q_n$ with $q_n$ at the center is derived, $Q_{n-1}$. Then the actual $a_n$ quaternion is computed by finding the midpoint of $Q_{n-1}$ and $q_{n+1}$. The $b_n$ quaternion is then symmetrically opposite $a_n$, again with $q_n$ at the center. The segments joining $q_n$ to $a_n$ and $b_n$ are then multiplied by one-third to give them the correct magnitude for a Bezier interpolation algorithm. The joint segment computation is illustrated in FIG. 4.

Figure 5:
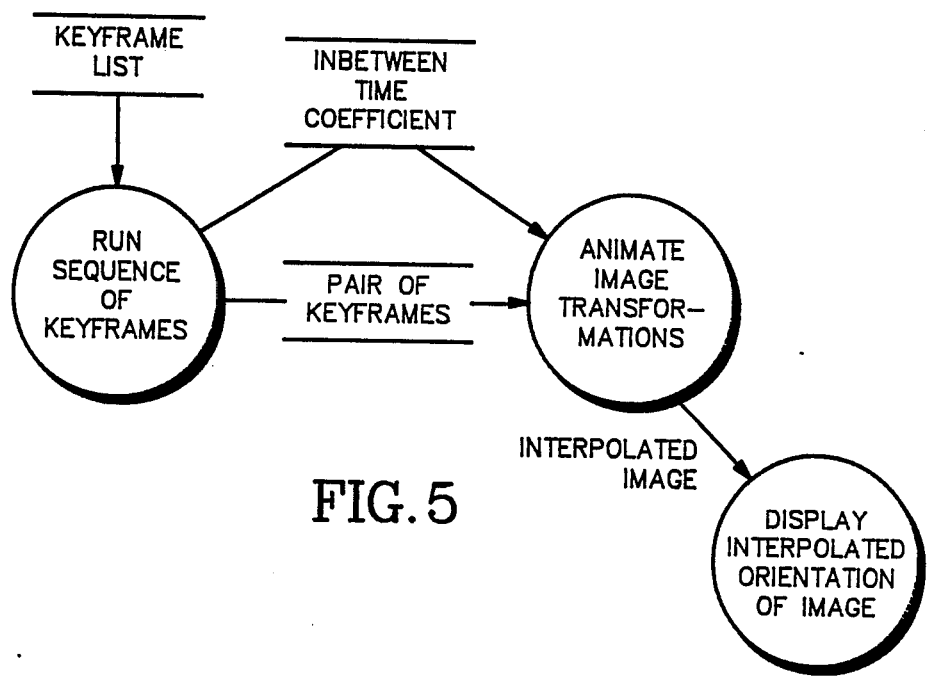
FIG. 5 is a general functional flow chart diagram of the process for animating the video image according to the present invention.

The second process, shown generally in FIG. 5, is an animation process. The operator has created a sequence of keyframe image orientations using the first process. Each keyframe contains the necessary transformation parameters to completely describe the orientation of the image at that point in time. The animation process inbetweens the orientation of the image between keyframes by interpolating the quaternions using a Bezier Spherical Linear Interpolation scheme. The effect keyframes are sent from the controller 18 to the inbetweener 16 where pairs of keyframes are inbetweened as a function of time. The quaternion parameters determine the rotation orientation of the image. The orientation path taken between two defined orientations is based on the most direct path between the two orientations, regardless of how the two rotations are oriented. The inbetweener 16 sends the interpolated orientation parameters to the numeric processor 14 where the transformation matrix is generated which is used by the video processor 12 to produce the transformed image.

The Bezier algorithm needs as input the source keyframe quaternion, the source keyframe outgoing quaternion, the destination keyframe incoming quaternion, the destination keyframe quaternion and the inbetweening time coefficient. The Bezier algorithm is based on the following spherical linear function:

Slerp(q1,q2;u) = {sin(1−u)b/sin(b)}*q1 + {sin(ub)/sin(b)}*q2 where u is a time coefficient which varies from 0 to 1, 0 indicating 0% and 1 being 100% of the time elapsed from q1 to q2; b is the angle between q1 and q2; and q1.q2=cos(b). The resultant quaternion of this Slerp function lies directly on the great circle arc connecting q1 and q2. Each call to this Slerp function is by itself a linear interpolation. By using the Bezier algorithm of central differences, first order continuous cubic motion is obtained. To interpolate one Bezier quaternion the above Slerp function is called six times.

Figure 10A:
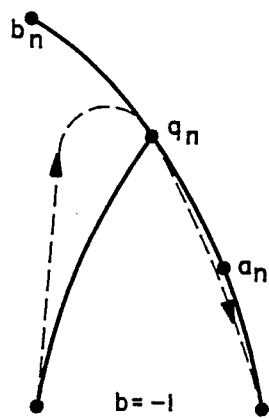
FIGS. 10A, 10B and 10C are graphical views illustrating the effect of a bias parameter upon the computation of the Bezier path according to the present invention.
Figure 10B:
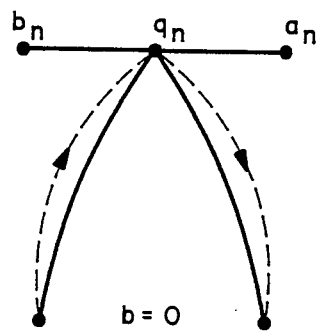
Figures 6, 10C:
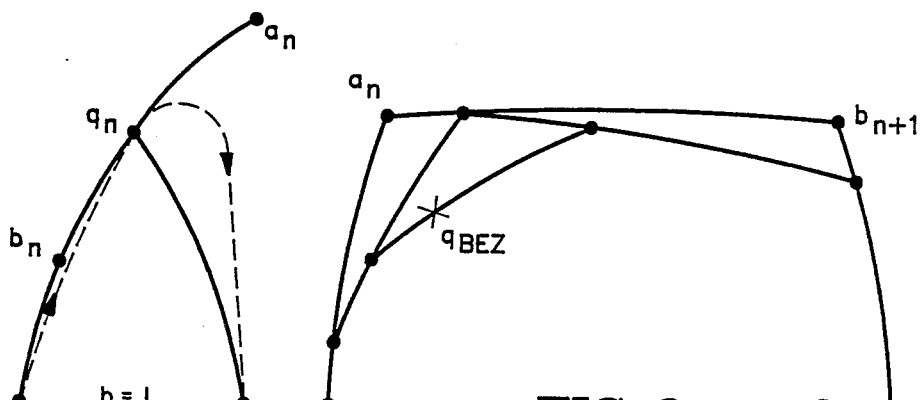
FIG. 6 is a graphical view illustrating the computation of intermediate quaternions between a pair of keyframe quaternions according to the present invention.

Given $q_n$, $a_n$, $b_{n+1}$ and $q_{n+1}$, the Slerp function is called with the arguments $q_n$ and $a_n$, with the arguments $a_n$ and $b_{n+1}$, and with the arguments $b_{n+1}$ and $q_{n+1}$. The results of these three calls are then used as arguments to the Slerp function producing two more quaternions. These two results are finally used as arguments to the Slerp function to produce the Bezier quaternion. All six of the Slerp calls use the same time coefficient u. The Bezier process is illustrated in FIG. 6.

Figure 7:
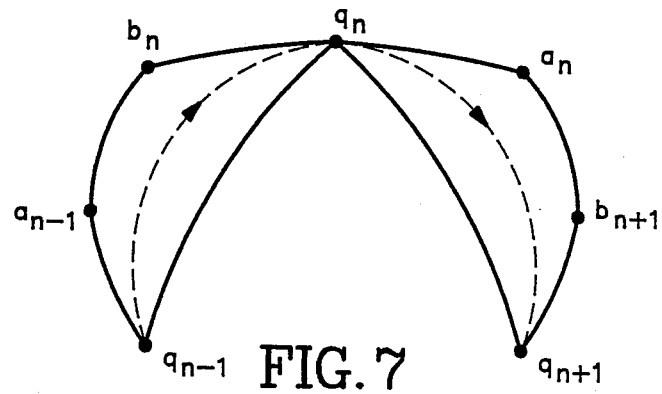
FIG. 7 is a graphical view illustrating an interpolated Bezier path between keyframes according to the present invention.

During the RUN mode when the effect is executed, the successive pairs of keyframes are interpolated. An example of an interpolated Bezier path connecting three keyframes, $q_{n-1}$, $q_n$ and $q_{n+1}$, is illustrated in FIG. 7 on a unit sphere. The first pair of keyframes is $q_{n-1}$ and $q_n$, and the second pair is $q_n$ and $q_{n+1}$. The interpolated quaternion is sent to the numeric processor 14 each field where the quaternion is converted to a rotation matrix. This rotation matrix is multiplied with the matrices generated from all of the other interpolated transformation parameters, producing the transformation matrix.

Multiple revolutions about one of the six axes, X, Y, Z SOURCE and X, Y, Z TARGET, may be accomplished between any two keyframes. These multiple revolutions, or spins, are interpolated separately from the keyframe quaternions. The spin angle of rotation is interpolated using a Hermite Spline algorithm and then is converted to a quaternion. The spin quaternion depends on which axis the spins are being applied to. This spin quaternion is then combined with the resulting quaternion from the Bezier algorithm. If SOURCE spin is selected, the Bezier quaternion is post-multiplied by the spin quaternion, i.e.:

$q_{new} = q_{Bez} * q_{spin}$, otherwise if TARGET spin is selected the Bezier quaternion is pre-multiplied by the spin quaternion. Thus multiple revolutions may be performed about one of the six axes and combined with the underlying Bezier rotation to yield a compound rotation.

Also the operator has a choice of path types between any two keyframes, such as cubic, S-linear, linear and hold. The Bezier algorithm provides the cubic path, one call to the Slerp function provides the linear path, and the hold path means no interpolation at all, i.e., the effect remains on the source keyframe until the effect time reaches the destination keyframe and then jumps to the destination keyframe. The S-linear path is obtained by setting the joint segments equal to the keyframe quaternion, resulting in a straight line, or great circle arc of the sphere, but with the velocity of its motion zero at both of the keyframes being interpolated, i.e., the motion along the S-linear path starts and ends "softly".

Figures 8A, 8B:
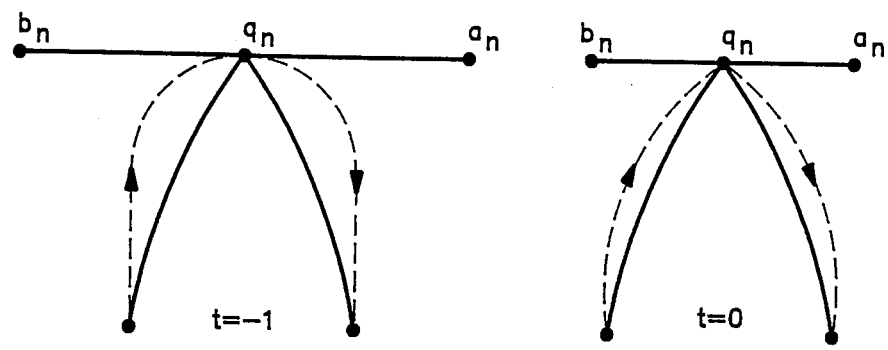
FIGS. 8A, 8B and 8C are graphical views illustrating the effects of a tension parameter upon the computation of the Bezier path according to the present invention.
Figures 8C, 9A:
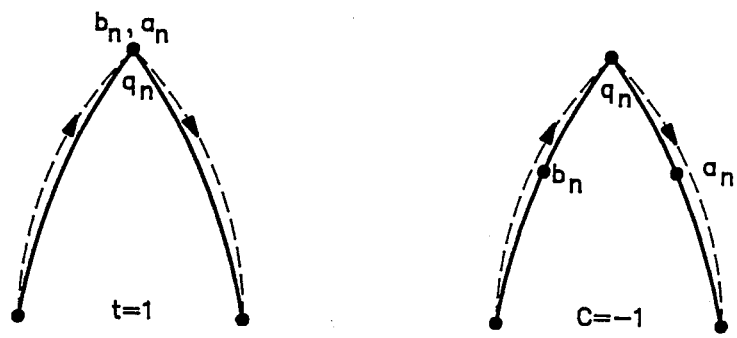
FIGS. 9A, 9B and 9C are graphical views illustrating the effects of a continuity parameter upon the computation of the Bezier path according to the present invention.
Figures 9B, 9C:
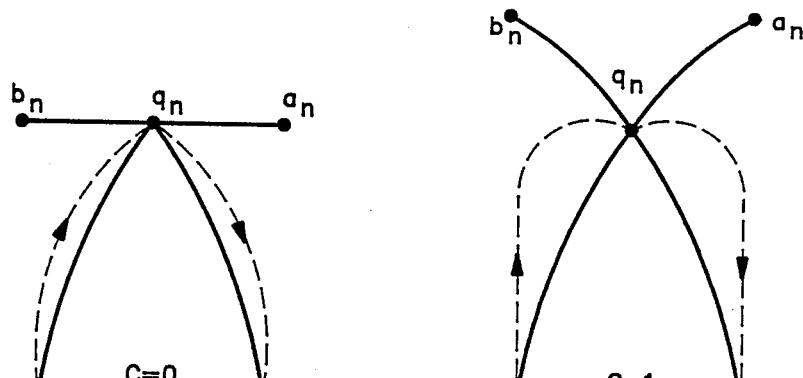

Finally the rotation orientation path of an effect is fine tuned by adjusting three parameters, tension, continuity and bias, which directly affect the joint segment quaternions associated with the keyframe quaternions. The joint segment quaternions determine the path of rotation as the effect passes through the keyframe quaternions. Each keyframe has its own tension, continuity and bias controls which provide local control over the rotation path. As shown in FIGS. 8A, 8B and 8C the tension parameter affects the magnitude of the joint segments which in turn changes the default path by "tightening" or "loosening" the path. If the tension parameter is increased, the magnitudes of the joint segments are correspondingly decreased, and vice versa. As shown in FIGS. 9A, 9B an 9C the continuity parameter causes abrupt changes in motion at the keyframe quaternion. This parameter causes the three quaternion points, $b_n$, $q_n$ and $a_n$, to become non-colinear, i.e., no longer lying on the same great circle arc, which causes discontinuous motion through the keyframe. Also as shown in FIGS. 10A, 10B and 10C the bias parameter changes the position of the joint segments while maintaining the symmetry and colinearity of the incoming and outgoing segments about the keyframe quaternion. This changes the tangent great circle arc connecting the $b_n$ and $a_n$ segments which effectively favors either the direction from $q_{n-1}$ to $q_n$ or from $q_n$ to $q_{n+1}$.

These three parameters independently affect the joint segment quaternions and range in value from −1 to 1 with 0 being the default value. The input parameters needed to compute the incoming and outgoing joint segment quaternions, $b_n$ and $a_n$, are $q_n$, $q_{n-1}$, $q_{n+1}$, t, c and b where t is tension, c is continuity and b is bias corresponding to the keyframe $q_n$. Also to prevent discontinuities in motion through the keyframes due to differences in keyframe durations, the keyframe durations, u, are needed. The algorithm to generate the joint segment quaternions is as follows:

$a_n$ = Bisect{$q_n$[($q_{n-1}^{-1} * q_n$)**pcdexp], $q_n$[($q_n^{-1} * q_{n+1}$)**cndexp]} and $$b_n = \text{Double}\{\text{Bisect}\{q_n{}^*[(q_{n-1}{}^{-1}{}^*q_n){}^{**}\text{pcsexp}], q_n{}^*[(q_n{}^{-1}{}^*q_{n+1}){}^{**}\text{cnsexp}]\}, q_n\}$$

where $$\text{pcdexp} = 2\{(\text{cdur})(1-t)(1+c)(1+b)\}/\{3(\text{pdur}+\text{cdur})\},$$
$$\text{cndexp} = 2\{(\text{cdur})(1-t)(1-c)(1-b)\}/\{3(\text{pdur}+\text{cdur})\},$$
$$\text{pcsexp} = 2\{(\text{pdur})(1-c)(1+b)\}/\{3(\text{pdur}+\text{cdur})\},$$
$$\text{cnsexp} = 2\{(\text{pdur})(1-t)(1+c)(1-b)\}/\{3(\text{pdur}+\text{cdur})\},$$

pdur is the duration between $q_{n-1}$ and $q_n$, cdur is the duration between $q_n$ and $q_{n+1}$, Bisect is a function which determines the midpoint between two quaternions, i.e., $\text{Bisect}(p,q) = (p+q)/M(p+q)$, and Double is a function which takes the first of two quaternion arguments and determines a symmetrical quaternion using the second of the two arguments as the center, i.e., $\text{Double}(p,q) = 2(p \cdot q)q - p$. Quaternion exponentiation, where $$q = \cos(a/2) + \sin(a/2)(\langle x,y,z \rangle),$$

is computed according to $$q^{**}e = \cos(ea/2) + \sin(ea/2)(\langle x,y,z \rangle).$$

Thus the present invention provides a method for orienting and animating images using quaternions by converting input Euler angles, either in the form of an absolute orientation or of an incremental orientation, into an appropriate quaternion, combining the incremental quaternion with the current quaternion according to a selected SOURCE or TARGET mode to form a new orientation, selecting certain orientations to be keyframes, sequencing a plurality of keyframes to form an effect, executing the effect by interpolating between keyframes using a Bezier algorithm to provide an orientation based upon the most direct path between any two keyframes, and fine tuning the interpolation path by using tension, continuity and bias parameters associated with each keyframe to produce a smooth rotation of a video image about any axis in three dimensions.

What is claimed is:

1. In a television video effects device of the type that transforms an input video image to provide motion of the input video image on a display a method for orientating and animating video images comprising the steps of:
   inputting new orientation parameters for the input video image, the input video image having a current orientation quaternion;
   converting the new orientation parameters into a new orientation quaternion for the input video image on a field by field basis; and
   transforming the new orientation quaterion into a transformation matrix for combination with the input video image to display the input video image in the new orientation.

2. A method as recited in claim 1 further comprising:
   selecting the new orientation quaternion to be a keyframe quaternion; and
   repeating the inputting, converting, transforming and selecting steps to generate a sequence of keyframe quanternions representative of a desired video effect.

3. A method for orientating and animating video images comprising the steps of:
   executing a desired video effect defined by a sequence of keyframe quaternions by interpolating between consecutive keyframe quaternions on a video field by field basis using a Bezier spherical linear interpolation algorithm, as modified by tension, continuity and bias parameters for each keyframe quaternion, to generate intermediate quanterions, the number of intermediate quaternions being a function of a desired time duration between keyframe quaternions; and
   transforming each intermediate quaternion into a transformation matrix for combination with the input video image to display the desired video effect.

4. A method as recited in claim 3 wherein the executing step includes the step of computing quaternion derivatives based on the keyframe quaternion for the new orientation and the quaternions of the two nearest neighboring keyframes from among the plurality of keyframe quaternions to form an incoming and an outgoing quaternion for the keyframe quaternion, the keyframe quaternion for the new orientation being located between the two nearest neighboring keyframes and the incoming and outgoing quaternions acting as control points to guide the interpolation of the intermediate quaternions as the effect sequence passes through the keyframe quaternion for the new orientation.

5. A method according to claim 3 wherein the executing step includes the steps of:
   interpolating a spin quaternion for each video field between successive pairs of keyframe quaternions for multiple revolutions of the video image using a Hermite spline function; and
   combining the spin quaternion with the corresponding intermediate quaternion to yield a compound intermediate quaternion.

6. A method according to claim 5 wherein the spin and intermediate quaternion combining step comprises multiplying the intermediate quaternion by the spin quaternion to yield the compound intermediate quaternion for spin about an axis related to the axes of the video image.

7. A method as recited in claim 5 wherein the spin and intermediate quaternion combining step comprises multiplying the spin quaternion by the intermediate quaternion to yield the compound intermediate quaternion for spin about an axis related to the axes of a surface upon which the video image is displayed.

8. A method as recited in claim 3 further including the step of selecting a path type for the rotational orientation path from among the group consisting of a cubic path, an S-linear path, a linear path and a hold path.

9. A method as recited in claim 3 further comprising the step of editing the desired video effect by inserting a selected intermediate quaternion along the interpolation path defined by the Bezier spherical linear interpolation algorithm as an intermediate keyframe quaternion between two consecutive keyframe quaternions without changing the interpolation path.

10. A method as recited in claim 5 wherein the interpolating step comprises the steps of:
    interpolating a spin angle of rotation using a Hermite spline algorithm; and
    converting the interpolated spin angle to the spin quaternion.

11. A method for orientating and animating video images comprising the steps of:
- inputting new orientation parameters for an input video image defined by a current quanternion;
- converting the new orientation parameters into an incremental quaternion representative of the change in orientation from the current quaternion;
- multiplying the current quaternion by the incremental quaternion to provide rotation about an axis related to the axes of the video image to produce a new orientation quanternion; and
- transforming the new orientation quaternion into a transformation matrix for combination with the input video image to display the new orientation.

12. A method for orientating and animating video images comprising the steps of:
- inputting new orientation parameters for an input video image having a current quaternion;
- converting the new orientation parameters into an incremental quaternion representative of the change in orientation from the current quaternion;
- multiplying the incremental quanternion by the current quaternion to provide rotation about an axis related to the axes of the video image to produce a new orientation quaternion; and
- transforming the new orientation quaternion into a transformation matrix for combination with the input video image to display the new orientation.

13. An improved video effects device for orientating and animating video images of the type having means for transforming an input video image to produce motion of the input video image on a display, the improvement comprising:
- means for converting input orientation parameters for the input video image having a current orientation quaternion into a new orientation quaternion on a field by field basis;
- means for transforming the new orientation quaternion into a transformation matrix; and
- means for combining the transformation matrix with the input video image so that the input video image appears on the display in the new orientation defined by the new orientation quaternion.

14. A video effects device as recited in claim 13 further comprising:
- means for selecting the new orientation quaternion to be a keyframe quaternion, a plurality of said keyframe quaternions in sequence forming a desired video effect.

15. A video effects device for orientating and animating video images comprising:
- means for generating a sequence of keyframe quaternions defining a desired video effect for an input video image;
- means for executing the desired video effect by interpolating between consecutive keyframe quaternions on a video field by field basis using a Bezier spherical linear interpolation algortihm as modified by tension, continuity and bias parameters to generate an intermediate quaternion for each field between keyframes; and
- means for transforming the intermediate quaternions to generate respective transformation matrices for combination with the input video image to produce the desired video effect on a display.

16. A video effects device as recited in claim 15 further comprising means for editing the desired video effect by inserting a selected intermediate quaternion as an intermediate keyframe quaternion between consecutive keyframe quaternions along the interpolation path defined by the Bezier spherical linear interpolation algorithm without changing the interpolation path between the keyframe quaternions.

17. A video effects device as recited in claim 15 further comprising:
- means for interpolating a spin quanternion on a field by field basis between consecutive keyframe quaternions; and
- means for combining the spin quaternion with the corresponding intermediate quaternion to form a resultant quaternion for input to the transforming means.

18. A video effects device as recited in claim 17 wherein the interpolating means comprises:
- means for interpolating a spin angle of rotation using a Hermite spline algorithm; and
- means for converting the interpolated spin angle to the spin quanternion.

19. A video effects device for orientating and animating video images comprising:
- an operator interface for inputting orientation parameters for an input video image having a current quaternion;
- a controller for converting the orientation parameters into a new orientation quaternion on a field by field basis for the input video image;
- means for transforming the new orientation quaternion into a transformation matrix; and
- means for combining the transformation matrix with the input video image for display on a video displayd evice as a newly orientated video image.

20. A video effects device for orientating and animating video images comprising:
- means for converting input orientation parameters for an input video image having a current quaternion into a new orientation quaternion for the input video image on a field by field basis;
- a numeric processor for transforming the new orientation quaternion into a transformation matrix; and
- means for combining the transformation matrix with the input video image for display on a video display device as newly orientated video image.

21. A video effects device for orientating and animating video image comprising:
- means for converting input orientation parameters for an input video image having a current quaternion into a new orientation quaternion for the input video image on a field by field basis;
- means for transforming the new orientation quaternion into a transformation matrix; and
- a video processor, having the input video image and transformation matrix as inputs, for combining the inputs into a transformed output video image for display.

* * * * *